(12) United States Patent
Capettini

(10) Patent No.: US 8,679,351 B2
(45) Date of Patent: Mar. 25, 2014

(54) PROCESS AND APPARATUS FOR DECONTAMINATING WATER BY PRODUCING HYDROXYL IONS THROUGH HYDROLYSIS OF WATER MOLECULES

(75) Inventor: Sergio Gabriel Capettini, Madrid (ES)

(73) Assignee: Hydrover Holding S.A. (LU)

( * ) Notice: Subject to any disclaimer, the term of this patent is extended or adjusted under 35 U.S.C. 154(b) by 810 days.

(21) Appl. No.: 12/649,612

(22) Filed: Dec. 30, 2009

(65) Prior Publication Data

US 2011/0155577 A1 Jun. 30, 2011

(51) Int. Cl.
*C02F 1/48* (2006.01)

(52) U.S. Cl.
USPC ...... 210/748.01; 204/661; 204/555; 204/155; 204/228.3; 210/153; 210/167.01; 210/243; 429/218.1; 422/22; 422/105; 422/243

(58) Field of Classification Search
USPC ............ 210/748.01, 153, 167.01, 167.3, 243, 210/321.6, 209, 96.1, 143; 429/218.1; 204/155, 156, 157.15, 164, 228.3, 665, 204/666; 205/628; 340/664
See application file for complete search history.

(56) References Cited

U.S. PATENT DOCUMENTS

| | | | |
|---|---|---|---|
| 2002/0070107 A1* | 6/2002 | Usinowicz et al. | 204/228.3 |
| 2008/0057398 A1* | 3/2008 | Wei et al. | 429/218.1 |
| 2008/0289950 A1* | 11/2008 | Andelman et al. | 204/157.15 |

* cited by examiner

*Primary Examiner* — Walter D Griffin
*Assistant Examiner* — Cameron J Allen
(74) *Attorney, Agent, or Firm* — Ostrolenk Faber LLP

(57) ABSTRACT

A water decontaminization system and method which utilizes an apparatus for producing hydroxyl ions through hydrolysis of water molecules to oxydize contaminents in the water. The apparatus includes a water chamber with an input water conduit and an output water conduit to establish a water flow in the chamber, in which electrodes positioned in the water chamber apply a voltage potential which causes electric current to flow through the water to create hydroxyl ions in the water, in a manner effective to kill contaminents such as viruses, bacteria, algae, organic substances, etc.

13 Claims, 7 Drawing Sheets

HYDROGEN   OXYGEN   HYDROGEN

HYDROGEN MOLECULE/GAS

OXYGEN/GAS

WATER MOLECULE
HYDROGEN   OXYGEN   HYDROGEN

PROCESS AND APPARATUS FOR DECONTAMINATING WATER BY PRODUCING HYDROXYL IONS THROUGH HYDROLYSIS OF WATER MOLECULES

FIELD OF THE INVENTION

This invention relates to water decontamination, i.e., disinfecting processes which particularly rely on hydrolysis based oxidation of contaminants (viruses, bacteria, algae, organic substances, etc.) present in contaminated water.

BACKGROUND OF THE INVENTION

At present, in water disinfecting processes, the destruction of the above mentioned contaminants through oxidation is increasingly being accepted, due to growing resistance to the conventional disinfecting treatment with chlorine, brome, hydrogen peroxide, etc. This is also the case with "Legionella", among other bacteria. Both, the levels of contamination and the corresponding procedures for controlling those levels are subject to the European Community regulations as well as to each autonomous community's laws within Spain. The world trend is to find alternatives to the current disinfecting chemical systems and/or products; thus aiming at processes which are as eco-friendly as possible. This means limiting or substituting those chemical products which might damage the environment.

Since water conductivity varies considerably, the conventional techniques evidence some limitations to their own proper development and implementation with the large variety of types of water. Even though information about studies and attempts to find new alternatives to hydrolysis is available, the present inventor has not found the disclosed technology nor its corresponding processes to be in accordance with the present invention so as to solve the technical limitations which have been identified and solved by the instant invention.

Water disinfecting processes in accordance with the present invention rely upon production of hydroxyl ions, a powerful oxidizing species, by hydrolysis of water molecules to "oxidize" contaminants and/or organic substances present in the contaminated water bodies, regardless of the specific water conductivity of the given water being treated.

As known, chemical "oxidation" of contaminants in water relates to the currently implemented conventional chemical process that utilizes chemical products (chlorine, brome, etc.) or to electronic processes such as salt electrolysis or ozone generator systems.

One of the disadvantages and difficulties of electronic oxidation systems arises from the fact that the production of hydroxyl ions by hydrolysis of water molecules to oxidize contaminants is directly proportional to water conductivity, and such conductivity determines both the hydroxyl ions' effectiveness and quantity. This limits the efficacy of the process.

Water conductivity varies considerably depending on its origin. Measurements show rather different figures; from the conductivity of river water (50-80 ppm) with total dissolved solids, to the conductivity of desalinated water (8,000 ppm). Thus, hydrolysis of water molecules wherein continuous voltage power is applied to the electrodes in the water (per the basic technique of any electrolysis) generates amperage in the electrodes which is directly proportional to the conductivity of the contaminated water. This means that hydrolysis processes with low conductivity water are not very effective since the generated amperage will not be sufficient to obtain the necessary levels of hydroxyl ions for properly oxidizing water contaminants (viruses, bacteria, algae, etc.). Likewise, hydrolysis of high conductivity water, suffers from problems at the hydroxyl ion generation source. In this particular case, the problem is in the electronic control unit that supplies the continuous voltage into the electrodes, because the high conductivity of water might damage the electronic system of the control unit due to excessive current draw.

SUMMARY OF THE INVENTION

In order to reduce the mentioned technical limitations of hydrolysis of water molecules, the present invention provides a new process by which the voltage in the electrodes is automatically regulated by means of an electronic control unit that measures the conductivity of water on a continuous basis and produces the precisely needed electric voltage to obtain just the right amount of current. To this end, the invention comprises a programmed control unit, which determines the correct quantity of the generated hydroxyl ions. In this way, the efficacy related to the quantity of generated hydroxyl ions is guaranteed since water conductivity will not adversely affect the generation of hydroxyl ions for oxidizing contaminants present in water, thereby maximizing oxidation, regardless of the conductivity. In comparison to the previous techniques, the present invention benefits water disinfecting processes with this technical advantage and hence minimizes the current limitations of hydrolysis of water molecules with an electronic system.

Hydrolysis of water molecules is a chemical process in which a water molecule is cleaved into different fragments by electric power. The main hydrolysis reaction is given as:

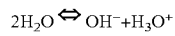

$$2H_2O \Leftrightarrow OH^- + H_3O^+$$

Water molecule lysis entails a standard oxidation-reduction potential of)($E^0$) 1.8 V. In the case of pure water, lysis is rather weak, for which reason it is necessary to reach a certain level of both dissolved solids and conductive molecules (corresponding to the TDS and conductivity parameters, respectively, under regular water tests) to achieve efficient water sanitization.

This way, the invention produces the most powerful oxidizing species for decontaminating water, avoiding the use of chemical products. In the particular case of hydroxyl ions generated by hydrolysis of water molecules, the oxidation-reduction potential is 2.05 V, and its effect is exceeded only by fluorine which cannot, however, be used as a chemical sanitizer due to its high toxicity.

The foregoing and other objects, features, aspects and advantages of the present invention will become more apparent from the following detailed description of the present invention when taken in conjunction with the accompanying drawings.

DETAILED DESCRIPTION

The most relevant measures of REDOX potential are detailed in TABLE 1:

TABLE 1

Oxidizing species generated by the system of the invention.
REDUCTION POTENTIAL - OXIDATION (ORP)

| Chemical Name | Formulae | Measure ORP |
| --- | --- | --- |
| Fluorine | $F_2$ | 2.25 |
| Hydroxyl ion | $OH^-$ | 2.05 |
| Mono-atomic oxygen | $O^-$ | 1.78 |
| Ozone | $O_3$ | 1.52 |
| Hydrogen peroxide | $H_2O_2$ | 1.30 |
| Potassium permanganate | $KMn_2O_7$ | 1.22 |
| Hypochlorous acid | HClO | 1.10 |
| Chlorine (Gas) | $Cl_2$ | 1.00 |
| Oxygen | $O_2$ | 0.94 |
| Sodium hypochlorite | NaClO | 0.69 |

Various terms used herein and descriptions thereof are presented below.

Figure 1:
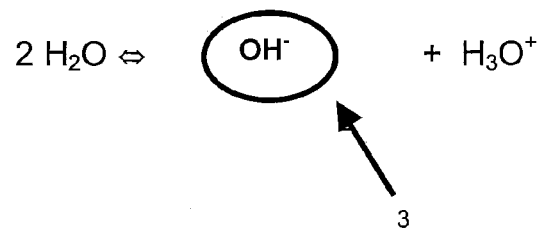
FIG. 1 shows the main reaction of hydrolysis of water molecules, wherein the water molecule cleaves into different groups due to the injection of electric power through a pair of electrodes (6) onto it.
Figure 2:
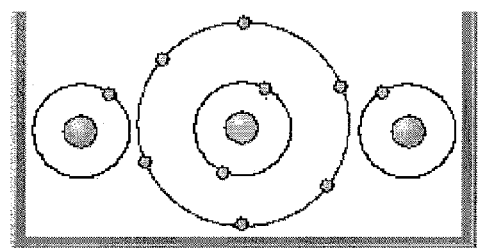
FIG. 2 shows that the water molecule is a highly stable chemical substance, which neither cleaves nor ionizes easily. The $H_2O$ molecule is composed of two hydrogen atoms and one oxygen atom.

Water structure: The water molecule is a highly stable chemical substance. It neither cleaves nor ionizes easily. The $H_2O$ molecule is composed of two hydrogen atoms and one oxygen atom (See FIG. 2).

Figure 3:
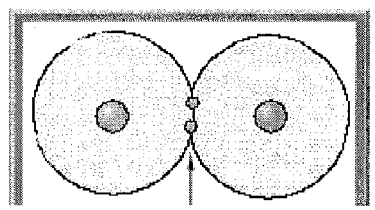
FIG. 3 shows that at a standard pressure and temperature, elemental hydrogen is a gas with the molecular formula $H_2$. Both hydrogen atoms share two electrons.

Hydrogen: At standard pressure and temperature, elemental hydrogen is a gas with the molecular formula $H_2$. Both hydrogen atoms share two electrons (See FIG. 3).

Figure 4:
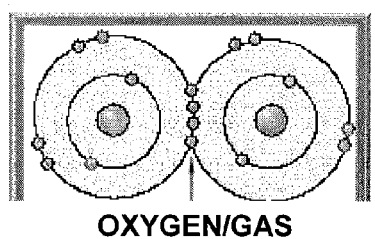
FIG. 4 shows that at standard pressure and temperature, elemental oxygen is a gas with the molecular formula $O_2$, with 8 protons, 8 neutrons and 8 electrons. Each oxygen atom shares 4 electrons with another atom.

Oxygen: At standard pressure and temperature, elemental oxygen is a gas with the molecular formula $O_2$, with 8 protons, 8 neutrons and 8 electrons. Each oxygen atom shares 4 electrons with another atom (See FIG. 4).

Figure 5:
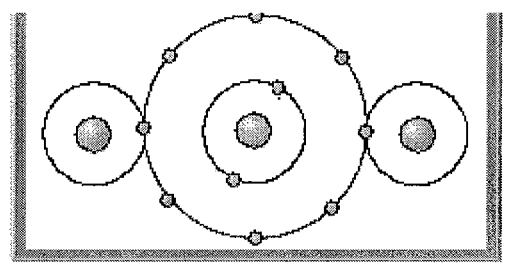
FIG. 5 shows that in $H_2O$, composed of two hydrogen atoms and one oxygen atom, each hydrogen nucleus is bound to the central oxygen atom by a pair of electrons that are shared between them.

Water molecule: In $H_2O$, composed of two hydrogen atoms and one oxygen atom, each hydrogen nucleus is bound to the central oxygen atom by a pair of electrons that are shared between them (see FIG. 5, which shows an equilibrium position of the positive and negative charges in a water molecule).

Ionization: When electricity is applied to water, electrolysis and ionization take place. One of the hydrogen ions escapes from the electric potential barrier that confines it to the water molecule, thus producing a hydrogen atom with a single proton and no electrons. When the negative electron exceeds the electric potential barrier, hydrogen becomes an ion with a positive electric charge.

Figure 6:
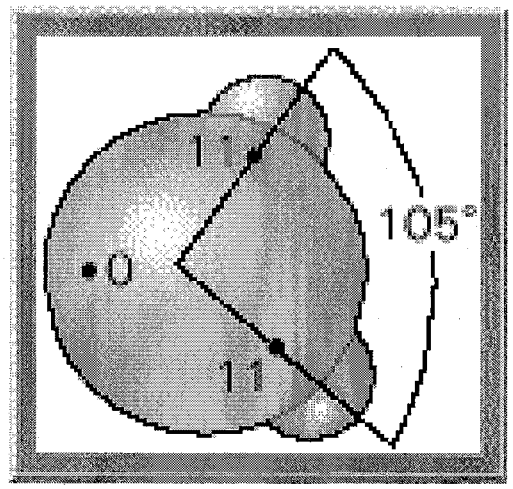
FIG. 6 shows that when a hydrogen ion is freed to move, the second hydrogen atom is bond to the oxygen atom with which it shares 10 electrons. This results in a further negative ion since the number of electrons exceeds the number of protons. A negatively-charged hydroxide is therefore produced.

Ionization of water: When a hydrogen ion is freed to move, the second hydrogen atom is bond to the oxygen atom with which it shares 10 electrons. This results in a further negative ion since the number of electrons exceeds the number of protons. A negatively-charged hydroxide is therefore produced (See FIG. 6).

Ions: The atom that has acquired an electric charge is called an ion. Ionized atoms have either a negative or positive electric charge. Ionized atoms can have one or more negative or positive electric charge. This happens when the atom frees or catches one or more electrons, thus changing the electric equilibrium between protons and neutrons.

Anions: An anion is an ion with more electrons than protons, giving it a negative charge.

Cations: A cation is an ion with more protons than electrons, giving it a positive charge.

Conductivity: For the sake of knowing the quantity of ions dissolved in water, "conductivity" parameter is used to characterize water.

For example, a sodium ion is positively charged and a chlorine ion is negatively charged. The result of their combination is table salt; with a neutral electric charge (i.e. it has no electric charge). When salt dissolves in distilled water, sodium becomes a positively charged ion and chlorine becomes a negatively charged ion and water becomes conductive. The symbol of atomic chlorine is Cl, and the symbol of a chlorine ion is $Cl^-$.

Figure 7:
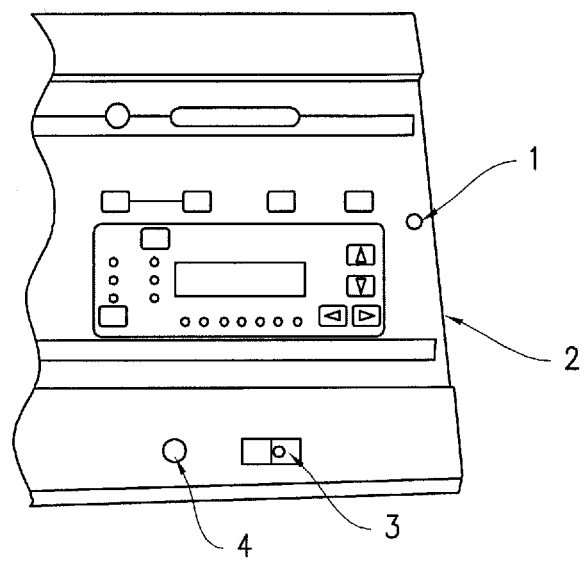
FIG. 7 shows the control unit of the invention.

The invention herein described includes the following parts of the apparatus:

ELECTRONIC CONTROL UNIT: FIG. 7 shows a sealed combustion box (7) with an in-built electronic sheet that transforms the standard electric power (220 V or 110 V, 50 or 60 Hz.) into continuous low-voltage-and-amperage electric power which will be then applied to the electrodes located in the electrodes (6) chamber. It has a programming keyboard (1) to adjust operating time and mode. It is worth mentioning that the control unit is such that the voltage sent to the electrodes (6), is adjusted accordingly and permanently based on the conductivity of water so that the desired amperage is obtained for the generation of the necessary hydroxyl ion to oxidize contaminants, regardless of water conductivity.

Figure 8:
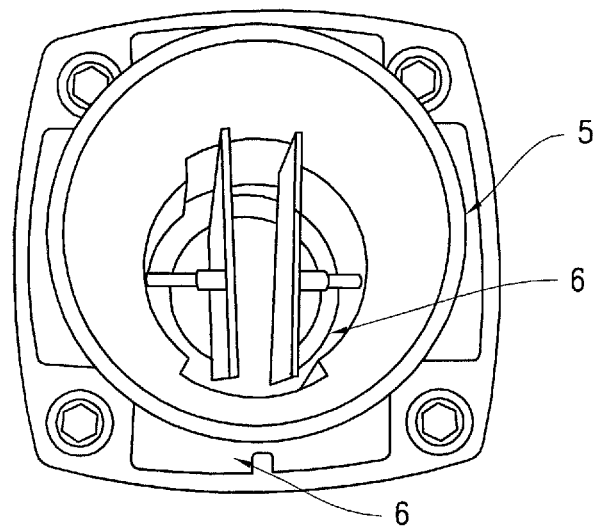
FIG. 8 is a front view of the electrodes chamber.
Figure 9:
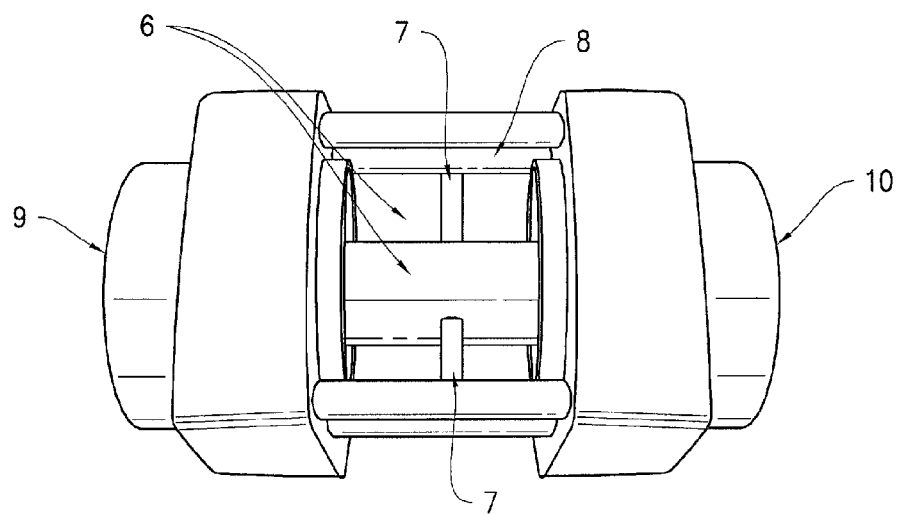
FIG. 9 is a side view and shows the electrical connections of the electrodes chamber.

ELECTRODES CHAMBER: One or more chambers are made as shown in FIGS. 8 and 9, to achieve the desired purpose of handling the type of contaminated water which will flow into them through water entry and exit outlets. They have a pair of titanium electrodes installed in parallel at a distance of at least 0.5 mm (depending on water conductivity). Each electrode has an electric connection to which the cable from the control unit is connected and through which the proper continuous electric power is sent for hydrolysis of water molecules to take place. The electric power is sent to the titanium electrodes (coated with noble metals) which works as a cathode-anode pair for hydrolysis of water molecules by utilizing the contaminated water as raw material for its sanitization process (See FIG. 9) electric connection (7). Water molecule cleaves into a large number of hydroxyl ions ($OH^-$), mono-atomic oxygen ($O_1$), etc., thus creating a combination of the most powerful existing oxidizing species for water disinfecting, avoiding the use of chemical products. In the particular case of hydroxyl ions generated by hydrolysis of water molecules, the oxidation-reduction potential is 2.05, exceeded only by the potential for fluorine. Therefore, the method of the present invention is easy to implement due to its simplicity (See FIGS. 7, 8 and 9) since it only entails an electronic control unit and one or more titanium electrodes chambers, depending on the type of water, wherein the production of hydroxyl ions for oxidizing contaminants present in water flowing through the electrodes chamber is thus enabled.

In FIG. 8, the electrodes (6) chamber (8) can be transparent to render the electrodes visible. The drawing shows the front view of the chamber (8). The side view of the electrodes chamber (FIG. 9) shows its components: chamber (8), a pair of electrodes (6), cables connections (7) from the control unit (2), water entry outlet (9) and water exit outlet (10).

Figure 10:
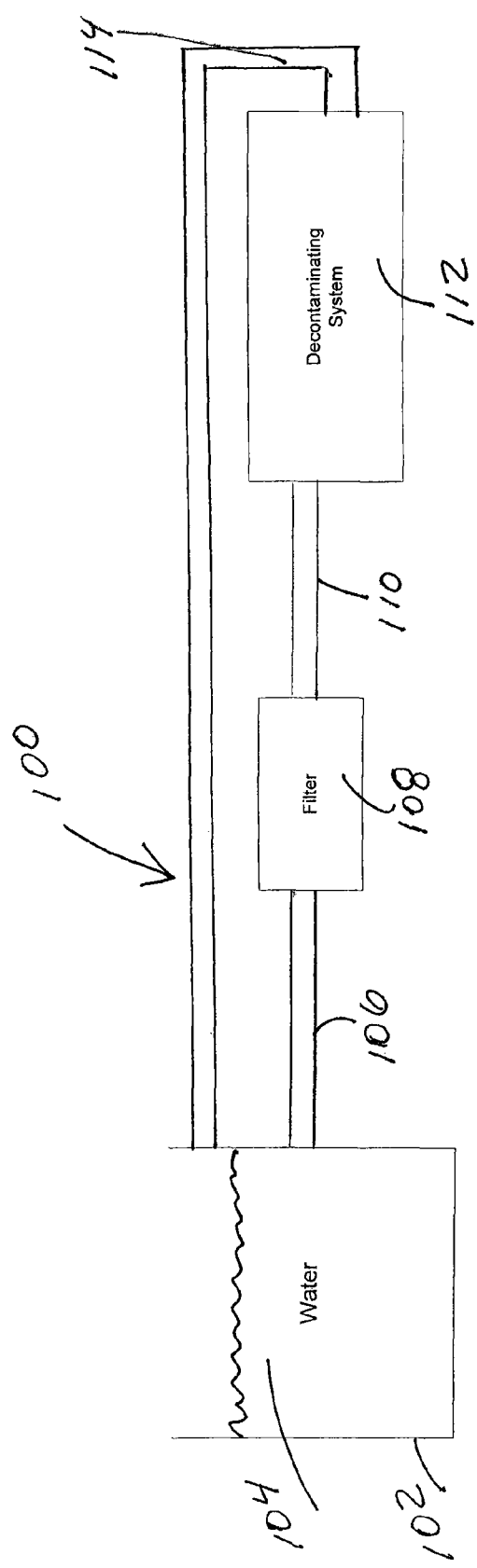
FIG. 10 is a system diagram showing a water source with a filter system which draws and provides water to the disinfecting system of the present invention.

Referring to FIG. 10, a decontaminated water system 100 comprises a water container 102, which may be a home pool, a drinking water tank in a home and the like, containing water 104 requiring filtration and disinfecting. A water conduit 106 supplies the water to a filter 108 which supplies the filtered water through a conduit 110 to the disinfecting system 112 of the present invention. It is implicit that the filter 108 may contain the various pumps and other water regulating apparatus to enable withdrawing and pumping the water through the closed system shown in FIG. 10. The disinfecting system utilizes the principles of hydrolysis to decontaminate the water and then to return it via conduit 114 to the water tank 102.

Figure 11:
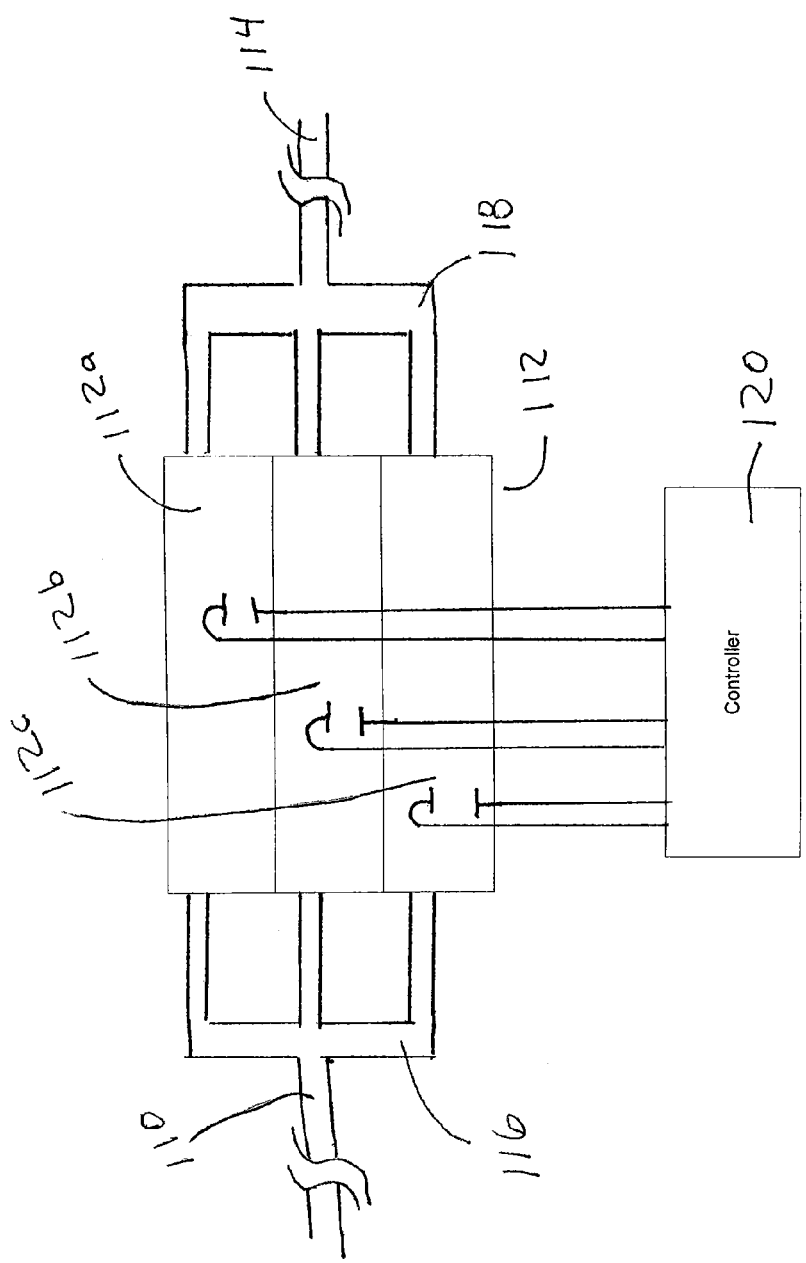
FIG. 11 is a more detailed block diagram of the disinfecting system of FIG. 10.

In FIG. 11, the disinfecting system 112 is shown to comprise one or more disinfecting chambers 112a, 112b, 112c, etc., all of which are supplied with electronic current to create hydroxyls to decontaminate the water flowing therethrough by the operation of the controller 120. Input and output manifolds 116, 118, respectively, provide the water to one or more of the individual chambers.

Figure 12:
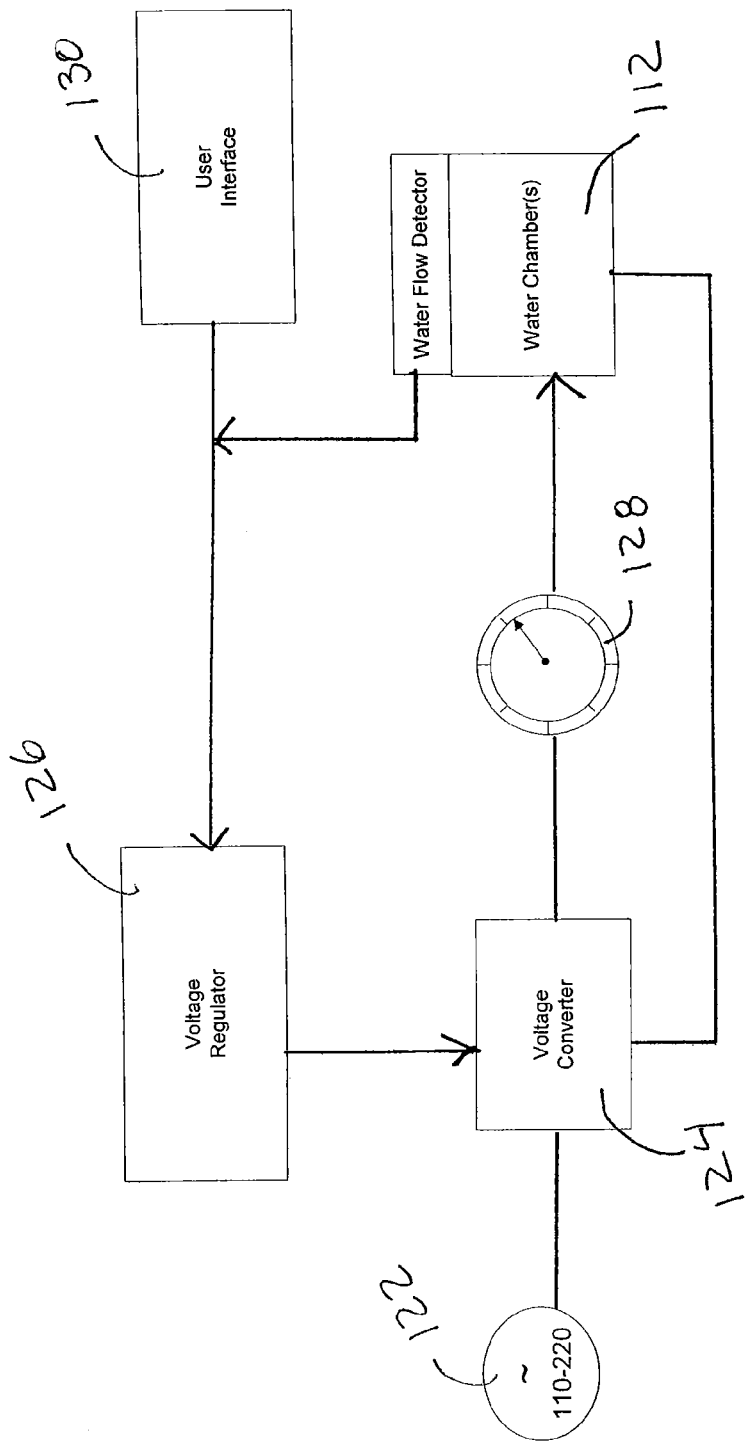
FIG. 12 is a more detailed block diagram of the controller of FIG. 11.

The controller 120 shown in FIG. 12 is coupled to an AC electrical source 122 which can supply grid voltage to a voltage converter and controller which is intended to produce a very low voltage in the range of approximately 1 to 12 volts and to be very carefully regulated as to its amplitude to produce just the right amount of current flow through the water chambers 112. As previously described, the output as a small magnitude voltage which can start at, e.g., 1 V, is applied to the water chamber. The current meter 128 senses the current to detect that the maximum current level is not exceeded through providing its current sensing output to the voltage regulator 126. The voltage regulator 126 is also responsive to a user interface 130. The voltage is slowly stepped up to obtain just the right amperage through the water in the water chamber 112. This is a closed loop system and an ongoing process as previously described.

Implicit in the system of FIG. 12 is the need to measure the conductivity of the specific water 104 which may be treated in the given application. A water flow detector in the chambers may be provided to enable and trigger the regulator into operation.

Measuring the conductivity of the water is a process which is indirectly performed by the controller 120. In an exemplary process, the electronic control unit outputs an initial voltage of, e.g., 1 V DC to the electrodes which make contact with water. An initial current is registered flowing between the electrodes and through the water and this current magnitude is communicated back to the voltage regulator 126. If the current in the electrode does not exceed a maximum current allowed in the system, the voltage is stepped up gradually until the current reaches a predetermined, desired "set point" current which has been preset in the voltage regulator. At that point, the voltage output is maintained at its level as the process continuously works to decontaminate the water. This is a closed loop system which operates on a continuous process and does not stop as long as water keeps flowing to the water chamber.

Thus, if the conductivity of the water is very low, i.e., the electrical resistance is very high, the control box will increase the voltage outputted to the electrodes to reach the desired current. Conversely, if the water conductivity is too high, i.e., the water has a low resistance to electrical current, the electronic controls will adjust the voltage downwardly to maintain the current at or just below the "set point" current. The set point current is a value that is intended to be maintained once the system is in a working mode and it is also a parameter that is settable by an installer or at the factory depending on the model or the particular application. For example, in certain applications, a greater current may be desired in order to produce a greater throughput in the water sanitization process.

The closed loop control system of the controller 12 can work at a periodic rate involving adjusting the voltage at a rate of once a second or at either greater or slower rates depending on a desired application. It may include a hysteresis lock to prevent adjustment of the output voltage if the current is not changed by more than a predetermined amount between measurements.

To obtain greater or lower throughputs of water disinfecting, it would involve either obtaining larger electrodes that make greater contact with the water surface or obtaining multiple chambers as needed, including manufacturing different sizes of chambers for obtaining the desired flow rate capacity. The system of the present invention may operate with or without an external filter. Alternatively, an internal filter which may be a static filter or different type of filters may be provided at the input to the disinfecting system.

Preferably, the electrodes are titanium electrodes coated with noble metals.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. An apparatus for optimizing production of hydroxyl ions through hydrolysis of water molecules to oxydize contaminents in water, the apparatus comprising:
    a water chamber with an input water conduit and an output water conduit for enabling water to flow through the water chamber;
    an electrical power source;
    electrodes positioned in the water chamber to receive electrical power and to cause an electric current to flow through the water in the water chamber; and
    a control unit coupled with the electrical power source and configured to provide a continuous voltage and current as said electrical power, the control unit being further configured to automatically adjust the voltage applied to the electrodes, based on continuous determining of the current flowing between the electrodes to establish in the water an electrical current magnitude that varies in proportion to the electrical conductivity of the water, thereby enabling continuous generation of hydroxyl ions that varies in proportion to the quantity of hydroxyl ions in the water being treated, without exceeding a maximum current magnitude.

2. The apparatus of claim 1, wherein the contaminents comprise organic substances.

3. The apparatus of claim 1, wherein the electrical power source is A/C electrical grid power in the range from 110 volts to 220 volts, at 50 to 60 Hz.

4. The apparatus of claim 1, in which the control unit is configured to apply to the electrodes the voltage in an auto adjustable range of 1-12 volts DC.

5. The apparatus of claim 1, wherein the water chamber is constituted of a plurality of individual chambers, with respective electrodes in each of the individual chambers.

6. The apparatus of claim 1, wherein the electrodes are constituted of titanium electrodes coated with noble metals.

7. The apparatus of claim 1, further including a water flow sensor which detects that water is flowing through the water chamber and produces an output which activates the control unit to begin applying a voltage to the flowing water.

8. The apparatus of claim 1, in combination with a water filtration system which pumps and filters water from a water reservoir and provides it to the decontaminization apparatus.

9. A method of decontaminating water, comprising the steps of:

provM a water chamber with an input water conduit and an output water conduit enabling water to flow through the water chamber;

positioning electrodes in the water chamber to receive electrical power and to cause an electric current to flow through the water in the water chamber;

converting power into a continuous voltage and current electrical power; and automatically adjusting the voltage applied to the electrodes to establish in the water a desired electrical current magnitude, regardless of the electrical conductivity of the water, in a manner which optimizes the quantity of hydroxyl ions in the water being treated, without creating an excessive current draw in the water.

10. The method of claim 9, including applying to the electrodes a voltage in the range of 1-12 volts DC.

11. The method of claim 9, including providing the water chamber in the form of a plurality of individual chambers, with respective electrodes provided in each of the individual chambers.

12. The method of claim 9, including sensing a water flow in the water chamber and producing an output which activates voltage being applied to the electrodes.

13. The method of claim 9, including providing a water flow through a water filtration system and pumping filtered water to the decontaminization apparatus.

* * * * *